(12) United States Patent
Venturino et al.

(10) Patent No.: US 8,488,441 B2
(45) Date of Patent: *Jul. 16, 2013

(54) COORDINATED LINEAR BEAMFORMING IN DOWNLINK MULTI-CELL WIRELESS NETWORKS

(75) Inventors: Luca Venturino, Cassino (IT); Xiaodong Wang, New York, NY (US); Narayan Prasad, Wyncote, PA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,244

(22) Filed: Mar. 7, 2012

(65) Prior Publication Data

US 2012/0170677 A1 Jul. 5, 2012

Related U.S. Application Data

(62) Division of application No. 12/477,255, filed on Jun. 3, 2009, now Pat. No. 8,218,422.

(60) Provisional application No. 61/058,295, filed on Jun. 3, 2008.

(51) Int. Cl.
*H04J 11/00* (2006.01)

(52) U.S. Cl.
USPC ........... 370/208; 375/259; 375/260; 370/310; 370/328; 370/329; 370/331; 370/332; 370/333; 455/402; 455/422.1

(58) Field of Classification Search
USPC .......................... 370/310–350; 455/403–460
See application file for complete search history.

(56) References Cited

U.S. PATENT DOCUMENTS

| | | | | |
|---|---|---|---|---|
| 8,218,422 | B2 * | 7/2012 | Venturino et al. | 370/208 |
| 2009/0111473 | A1 * | 4/2009 | Tao et al. | 455/440 |
| 2009/0180405 | A1 * | 7/2009 | Ashikhmin et al. | 370/280 |
| 2010/0111226 | A1 * | 5/2010 | Ko et al. | 375/299 |

* cited by examiner

*Primary Examiner* — Charles C Jiang
(74) *Attorney, Agent, or Firm* — Joseph Kolodka

(57) ABSTRACT

System and methods are disclosed for optimizing wireless communication for a plurality of mobile wireless devices. The system uses beamforming vectors or precoders having a structure optimal with respect to the weighted sum rate in a multi-cell orthogonal frequency division multiple access (OFDMA) downlink. A plurality of base stations communicate with the mobile devices and all base stations perform a distributed non-convex optimization exploiting the determined structure.

12 Claims, 3 Drawing Sheets

COORDINATED LINEAR BEAMFORMING IN DOWNLINK MULTI-CELL WIRELESS NETWORKS

The present application is a divisional of U.S. patent application Ser. No. 12/477,255, filed Jun. 3, 2009, which in turn claims priority to U.S. Provisional Application Ser. No. 61/058,295, filed Jun. 3, 2008, the content of which is incorporated by reference.

BACKGROUND

This application relates to linear beamforming for wireless devices in cellular networks.

Theoretical studies on the wireless broadcast channel have shown that significant throughput gains are possible when multiple antenna elements are installed at the transmitter and advanced spatial signal processing is employed to serve multiple co-channel terminals as opposed to the conventional time- and frequency-division multiple access. In particular, for an isolated network with M transmit antennas, n homogeneous users equipped with N receive antennas and block Rayleigh fading, the capacity of the multi-antenna Gaussian broadcast channel scales as $M \log_2 \log_2(nN)$ for increasingly large n, achieving both a multiplexing gain (M) and a multiuser diversity gain $\log_2 \log_2(nN)$.

A known capacity achieving strategy for the multi-antenna Gaussian broadcast channel involves a highly complex non-linear interference pre-cancellation technique, known as dirty paper coding (DPC), which is usually infeasible in practice. Several suboptimal strategies have been investigated to overcome this limitation. Among them, linear transmit beamforming has attracted great interests since it can achieve a large fraction of the capacity at much lower cost and implementation complexity. In linear beamforming, each data stream is modulated by a spatial signature vector before transmission through multiple antennas. Careful selection of the signature vectors can mitigate (or even eliminate) mutual interference among different streams. Surprisingly, random unitary beamforming is sufficient to achieve the same sum-rate scaling growth $M \log_2 \log_2(nN)$ of DPC for increasingly large number of users. However, when the number of users is smaller, random beamforming may perform poorly and more effective beamforming strategies have been proposed to achieve improved performance. They include for example linear minimum mean square error (MMSE) and zero-forcing CLF) beamforming. Other works, instead, make use of the uplink-downlink duality and design the transmit linear filters so as to minimize the total transmit power under given constraints on the users' rates. Others have designed transmit linear filters in order to maximize the sum-rate.

Many existing works have addressed the beamforming design problem by assuming that each base station communicates with its respective terminals independently: in such framework, inter-cell interference is simply regarded as additional background noise and the design of the beamforming vectors is performed on a per-cell basis only. However, future wireless cellular networks will be interference-limited; hence, significant performance gains are possible if inter-cell interference is mitigated via coordinated processing across multiple cells. Ideally, if both data and channel state information of all users could be shared in real-time, all base stations could act as a unique large array with distributed antenna elements and could employ joint beamforming, scheduling and data encoding to simultaneously serve multiple co-channel users. In practice, a much lower level of coordination appears to be feasible depending on the bandwidth of the backbone network connecting the base stations. For example, it may be reasonable to assume that each user is served by only one base station: in this case, the set of downlink beam-vectors can be optimized based on the inter-cell channel qualities. Also, complexity of the network infrastructure and synchronization requirements may limit the number of coordinating base stations: in this case, coordination can be performed on a per-cluster basis.

SUMMARY

System and methods are disclosed for optimizing wireless communication for a plurality of mobile wireless devices. The system uses linear beamforming vectors having a structure optimal with respect to the weighted sum rate in a multi-cell orthogonal frequency division multiple access (OFDMA) downlink, comprising a plurality of mobile devices; and a plurality of base stations communicating with the mobile devices, all base stations performing a distributed non-convex optimization exploiting the determined structure.

In one aspect, the system optimizes wireless communication for a plurality of mobile wireless devices by determining a structure for downlink beamforming vectors optimizing the weighted sum-rate across multiple orthogonal resource slots in the time, frequency or code domain; and distributing a non-convex optimization exploiting the determined structure over a plurality of base stations.

Implementations of the above aspect may include one or more of the following. The non-convex optimization is responsive to a set of channel estimates; user priorities; or maximum transmit power available at each base-station. The non-convex optimization utilizes Karush-Kuhn-Tucker (KKT) equations. The distribution over the base stations entails a small number of channel estimates at each base station and limited message passing among adjacent base stations. The system can obtain channel estimates. The system can also obtain predicted channel estimates responsive to an average scheduling delay parameter. A multiple-input single-output (MISO) system can be served wherein each user is equipped with a single receive antenna and receives a single data stream from its serving base station via space-division multiple-access (SDMA). The system can determine the optimal structure of the beamforming vectors optimizing the weighted sum-rate in a MISO system. A leakage matrix can be obtained, and in one implementation a leakage matrix $L_{m,k}(n)$ can be determined as:

$$L_{m,k}(n) = \sum_{j=1}^{M} \sum_{\substack{u \in B_j(n) \\ (j,u) \neq (m,k)}} P_{j,u}(n) G_{m,u}(n) \in C^P$$

where $$P_{j,u}(n) = \frac{\alpha_u(n) SINR_{j,u}(n)}{1 + \sum_{l=1}^{M} \sum_{s \in B_l(n)} w_{l,s}^H(n) G_{l,u}(n) w_{l,s}(n)}$$

$B_m(n)$ is the set of users served by base station m on slot n;
N is the total number of orthogonal resource slots;
M is the number of coordinated base stations;
P is the number of transmit antennas at each base station;
$w_{m,k}(n) \in C^P$ denotes the P-dimensional beam vector used by the base station m to serve user $k \in B_m(n)$ on slot n;
$W = \{w_{m,k}(n), k \in B_m(n), m=1, \ldots, M, n=1, \ldots, N\}$ indicates the collection of all beam vectors;

$\alpha_k(n)>0$ is the priority assigned by the scheduler to user k on slot n;

$P_{m,max}$ is the maximum transmit power of base station m;

$SINR_{m,k}(n)$ is the signal-to-interference-plus-noise ratio for user k served by base station m on slot n and is given by $$SINR_{m,k}(n) = \frac{w_{m,k}^H(n)G_{m,k}(n)w_{m,k}(n)}{1 + \sum_{j=1}^{M} \sum_{\substack{u \in B_j(n) \\ (j,u) \neq (m,k)}} w_{j,u}^H(n)G_{j,k}(n)w_{j,u}(n)}$$

with $G_{m,k}(n) = h_{m,k}(n)h_{m,k}^H(n) \in C^{P \times P}$.

$h_{m,k}(n) \in C^P$ is the P-dimensional channel vector between base station j and user k and slot n (which includes small-scale fading, large scale fading and path attenuation) normalized by the standard deviation of the received noise.

The system can also determine $$i_{m,k}(n) = \sum_{l=1}^{M} \sum_{\substack{s \in B_l(n) \\ (l,s) \neq (m,k)}} w_{l,s}^H(n)G_{l,k}(n)w_{l,s}(n),$$

$$k \in B_m(n), m = 1, \ldots, M, n = 1, \ldots N.$$

The determination of and $\lambda_1, \ldots, \lambda_M$ and $\{\hat{\beta}_{m,k}(n;\lambda_m), k \in B_m(n), n=1, \ldots N\}$ is:

$$|\hat{\beta}_{m,k}(n;\lambda_m)|^2 = \frac{\left(\alpha_k(n)h_{m,k}^H(n)\hat{T}_{m,k}^\dagger(n;\lambda_m)h_{m,k}(n) - \hat{i}_{m,k}(n) - 1\right)^+}{|h_{m,k}^H(n)\hat{T}_{m,k}^\dagger(n;\lambda_m)h_{m,k}(n)|^2}$$

and $$\sum_{n=1}^{N} \sum_{k \in B_m(n)} \underbrace{\|\hat{\beta}_{m,k}(n;\lambda_m)\hat{T}_{m,k}^\dagger(n;\lambda_m)h_{m,k}(n)\|^2}_{f_m(n;\lambda_m)} = P_{m,max}$$

where $\hat{T}_{m,k}(n;\lambda_m) = \hat{L}_{m,k}(n;\lambda_m) + (\lambda_m \ln 2)I_P$, $(\cdot)^\dagger$ indicates the pseudo-inverse and $x^+ = \max\{x,0\}$ and where $\{\hat{i}_{m,k}(n), \hat{L}_{m,k}(n)\}$ denotes most recent values of $\{i_{m,k}(n), L_{m,k}(n)\}$. The system can update beam vectors as $$w_{m,k}(n) = \hat{\beta}_{m,k}(n;\lambda_m)\hat{T}_{m,k}^\dagger(n;\lambda_m)h_{m,k}(n).$$

The system can select an initial feasible set of beam vectors. The initial feasible set can be selected after splitting power across the available slots. The system can perform channel-matched beamforming to select the initial feasible set of beam vectors. The system can also do in-cell zero-forcing beamforming to select the initial feasible set of beam vectors. Maximum signal-to-leakage-plus-noise ratio (MSLNR) beamforming can be used to select the initial feasible set of beam vectors. An equivalent MISO system can be provided wherein each mobile user has multiple-receive antennas and performs rank-one receive beamforming before detection. A multiple-input multiple-output (MIMO) system can be provided wherein each user is equipped with multiple receive antennas and receives multiple data streams from a serving base station via linear precoding. The optimal structure of the linear precoders in a MIMO system can be determined. A leakage matrix can be computed such as a leakage matrix $L_{m,k}(n)$ where:

$$L_{m,k}(n) = \sum_{j=1}^{M} \sum_{\substack{u \in B_j(n) \\ (j,u) \neq (m,k)}} \frac{\alpha_u(n)}{\ln(2)} H_{m,u}^H(n)$$

$$\left(R_{j,u}(n)^{-1} - (R_{j,u}(n) + H_{j,u}(n)Q_{j,u}(n)H_{j,u}^H(n))^{-1}\right)H_{m,u}(n),$$

where $$R_{m,k}(n) = \sum_{j=1}^{M} \sum_{\substack{u \in B_j(n) \\ (j,u) \neq (m,k)}} H_{j,k}(n)Q_{j,u}(n)H_{j,k}^H(n) + I_{N_k}.$$

$B_m(n)$ is the set of users served by base station m on slot n;
N is the total number of orthogonal resource slots;
M is the number of coordinated base stations;
P is the number of transmit antennas at each base station;
$N_k$ is the number of receive antennas of user k;
$Q_{j,u}(n) = W_{j,u}(n)W_{j,u}^H(n) \in C^{P \times P}$ is a covariance matrix to be optimized;
$W_{m,k}(n) \in C^{P \times D_{m,k}(n)}$, and $1 \leq D_{m,k}(n) \leq P$ indicates the number of data stream delivered to user $k \in B_m(n)$ on slot n by base station m;
$Q = \{Q_{m,k}(n) \in \overline{Q}, k \in B_m(n), m=1, \ldots, M, n=1, \ldots N\}$ indicates the collection of the positive-semidefinite covariance matrices;
$\alpha_k(n) > 0$ is the priority assigned by the scheduler to user k on slot n;
$P_{m,max}$ is the maximum transmit power of base station in; and
$H_{j,k}(n) \in C^{N_k \times P}$ is the channel matrix between base station/ and user k and slot n (which includes small-scale fading, large scale fading and path attenuation) normalized by the standard deviation of the received noise.

The system can solve a following convex optimization problem at each base-station in, for a given $\{L_{m,k}(n)\}$ and $\{R_{m,k}(n)\}$:

$$\operatorname*{argmax}_{\{Q_{m,k}(n)\}} \sum_{n=1}^{N} \sum_{k \in B_m(n)} [\alpha_k(n)\log_2|I_{N_k} + H_{m,k}(n)Q_{m,k}(n)H_{m,k}^H(n)R_{m,k}(n)^{-1}| - tr(L_{m,k}(n)Q_{m,k}(n))],$$

$$\text{s.t.} \sum_{n=1}^{N} \sum_{k \in B_m(n)} tr(Q_{m,k}(n)) \leq P_{m,max}, Q_{m,k}(n) \in \overline{Q}, \forall k \in B_m(n), \forall n$$

The system can select an initial feasible set of positive semi-definite covariance matrices after splitting power across available slots. Maximum Signal-to-Leakage-plus-Noise Ratio (MSLNR) precoding can be used to select the initial feasible set of positive semi-definite covariance matrices.

Advantages of the above systems and methods may include one or more of the following. By explicitly accounting for the inter-cell interference in the design of the beam vectors, the invention leads to substantial improvements in the system spectral efficiency (throughput).

DESCRIPTION OF FIGURES

Figure 1:
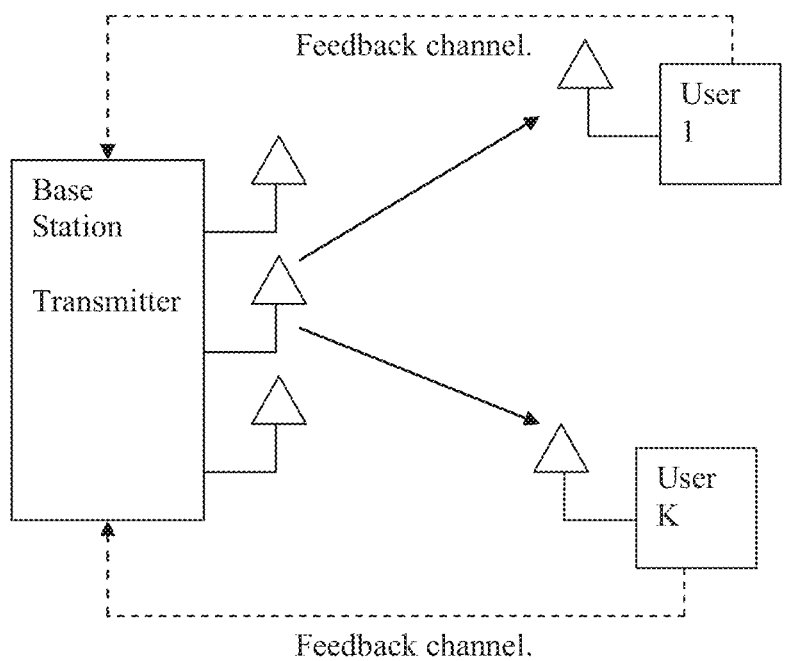
FIG. 1 shows a downlink multiuser system with P transmit-antennas at the base station communicating with multiple mobile stations or devices.

FIG. 1 shows a downlink multiuser system, with P transmit-antennas at the base station BS and 1 receive antenna at each user. A transmitter 110 transmits from P transmitting antennas 111.1-111.P over a fading channel to multiple users. Each user's receive antenna is coupled to a receiver. At each user a channel estimator provides an estimate of the channel corresponding to the propagation between the transmit antennas and the receive antenna, to the respective receiver. The channel estimate is also quantized and provided to the transmitter 110 via a feedback channel.

Figure 2:
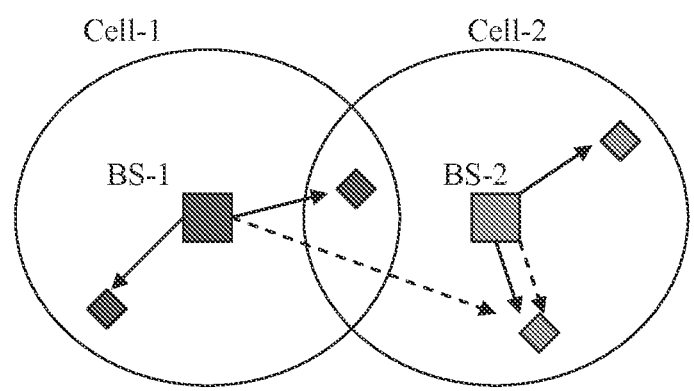
FIG. 2 shows an exemplary multi-cell setup.

FIG. 2 shows an exemplary multi-cell setup that handles co-channel interference mitigation in the downlink of a cellular system. In FIG. 2, all base stations are equipped with multiple transmit antennas and the mobiles are equipped with a single or multiple receive antenna each. Every base station employs linear beamforming or linear precoding to serve each one of its scheduled users or mobile devices on any resource slot and each scheduled user is served by only one base station. The association of each user to a particular base station (its serving base station) pre-determined. The base station of each cell serves its users through linear beamforming, or linear precoding. Each user receives useful (desired) signal from its serving base station (depicted using the solid line). Each user also receives interference (depicted as the dashed lines) from its serving base station as well as adjacent base stations. The interference includes all signals transmitted in the same resource slot (i.e., time/frequency/code slot) as the desired signal but which are intended for the other users. The system designs a set of beam vectors for a given set of channel estimates, which maximizes the weighted system sum-rate over a cluster of coordinated cells subject to per-base-station power constraints.

Embodiment I

MISO System

First, a multiple-input single-output (MISO) embodiment is discussed. The MISO system includes a downlink cellular network with universal frequency reuse where a cluster of it coordinated base stations simultaneously transmit on N orthogonal (in the time or frequency or code domain) resource slots during each scheduling interval. Each base station is equipped with P antennas and space-division multiple-access (SDMA) is employed to serve multiple mobiles (each having one receive antenna) on a resource slot. Each user is served by only one base station and coordinated base stations only exchange channel quality measurements and this scenario is referred to as a partially-connected cluster (PCC), Let $B_m(n)$ be the set of terminals scheduled by base station m on slot n, for m=1, ..., M and n=1, ..., N. For simplicity and without loss of generality, $|B_m(n)|=Q \forall m,n$ and $B_{m_1}(n_1) \cap B_{m_2}(n_2) = \emptyset$ for $m_1 \neq m_2$.

With linear precoding, the signal by base station m on slot n is expressed as $$x_m(n) = \sum_{k \in B_m(n)} w_{m,k}(n) b_{m,k}(n) \in C^P,$$

where $b_{m,k}(n)$ is the complex symbol transmitted by base station m on slot n to user $k \in B_m(n)$ using the beamforming vector $w_{m,k}(n) \in C^P$. One system uses the assumption that $E[|b_{m,k}(n)|^2]=1$, $E[b_{m_1,k_1}(n_1) b_{m_2,k_2}(n_2)^H]=0$ for $(n_1,m_1,k_1) \neq (n_2,m_2,k_2)$, and $$\sum_{n=1}^{N} \sum_{k \in B_m(n)} \|w_{m,k}\|^2 \leq P_{m,max},$$

where $P_{m,max}$ is the maximum transmit power of base station m;

Let $\tilde{h}_{j,k}(n) \in C^P$ be the channel matrix between base station j and user k on slot n, which includes small-scale fading, large-scale fading and path attenuation. The signal received by user $k \in B_m(n)$ on slot n is given by $$\tilde{y}_k(n) = \sum_{j=1}^{M} \tilde{h}_{j,k}^H(n) x_j(n) + \tilde{z}_k(n),$$

where $\tilde{z}_k(n)$ is the additive circularly-symmetric Gaussian noise with variance $\sigma_k^2(n)$: here, different noise levels account for different co-channel interference and different noise figures of the receivers. To simplify notation, the received signal is normalized by the noise standard deviation. Let $y_k(n)=\tilde{y}_k(n)/\sigma_k(n)$, $z_k(n)=\tilde{z}_k(n)/\sigma_k(n)$ and $h_k(n)=\tilde{h}_k(n)/\sigma_k(n)$, the following is obtained:

$$y_k(n) = \underbrace{h_{m,k}^H(n) w_{m,k}(n) b_{m,k}(n)}_{useful\ signal} + \underbrace{\sum_{j=1}^{M} \sum_{\substack{u \in B_j(n) \\ (j,u) \neq (m,k)}} h_{j,k}^H(n) w_{j,u}(n) b_{j,u}(n)}_{co\text{-}channel\ interference} + \underbrace{z_k(n)}_{noise}.$$

The objective function to be maximized is the (istantaneous) weighted system sum-rate subject to per-base-station power constraints. Assuming Gaussian inputs and single-user detection at each mobile, the problem to be solved is as follows:

$$\underset{W}{\operatorname{argmax}} \sum_{n=1}^{N} \sum_{m=1}^{M} \sum_{k \in B_m(n)} \alpha_k(n) \log_2(1 + SINR_{m,k}(n)) \quad [\text{problem 1}]$$

$$\text{s.t.} \sum_{n=1}^{N} \sum_{k \in B_m(n)} \|w_{m,k}(n)\|^2 \leq P_{m,max} \quad m=1, \ldots, M$$

where
- $W=\{w_{m,k}(n), k \in B_m(n), m=1, \ldots, M, n=1, \ldots N\}$ indicates the collection of all beam vectors,
- $\alpha_k(n)>0$ is the priority assigned by the schedule to user k on slot n; if $\alpha_k(n)=1/(NM)$, the objective function becomes the network sum-rate (measured in bits/channel-use/slot/cell); more generally, the scheduler may adjust the coefficients $\{\alpha_k(n)\}$ over time to maintain proportional fairness among terminals.

$SINR_{m,k}(n)$ is the signal-to-interference-plus-noise ratio for user k served by base station m on slot n and is given by $$SINR_{m,k}(n) = \frac{w_{m,k}^H(n)G_{m,k}(n)w_{m,k}(n)}{1 + \sum_{j=1}^{M}\sum_{\substack{u \in B_j(n) \\ (j,u) \neq (m,k)}} w_{j,u}^H(n)G_{j,k}(n)w_{j,u}(n)},$$

with $G_{m,k}(n) = h_{m,k}(n)h_{m,k}^H(n) \in \mathbb{C}^{P \times P}$.

The system first applies Lagrangian theory to derive the structure of the optimal beam-vectors; then, a process iteratively solves the set Karush-Kuhn-Tucker (KKT) conditions corresponding to the non-convex primal problem. A distributed implementation of the proposed algorithm is illustrated. Also, several approaches to choose the initial beam-vectors can be followed. Finally, an extension of the proposed algorithm to an equivalent MISO system is discussed.

Figure 3:
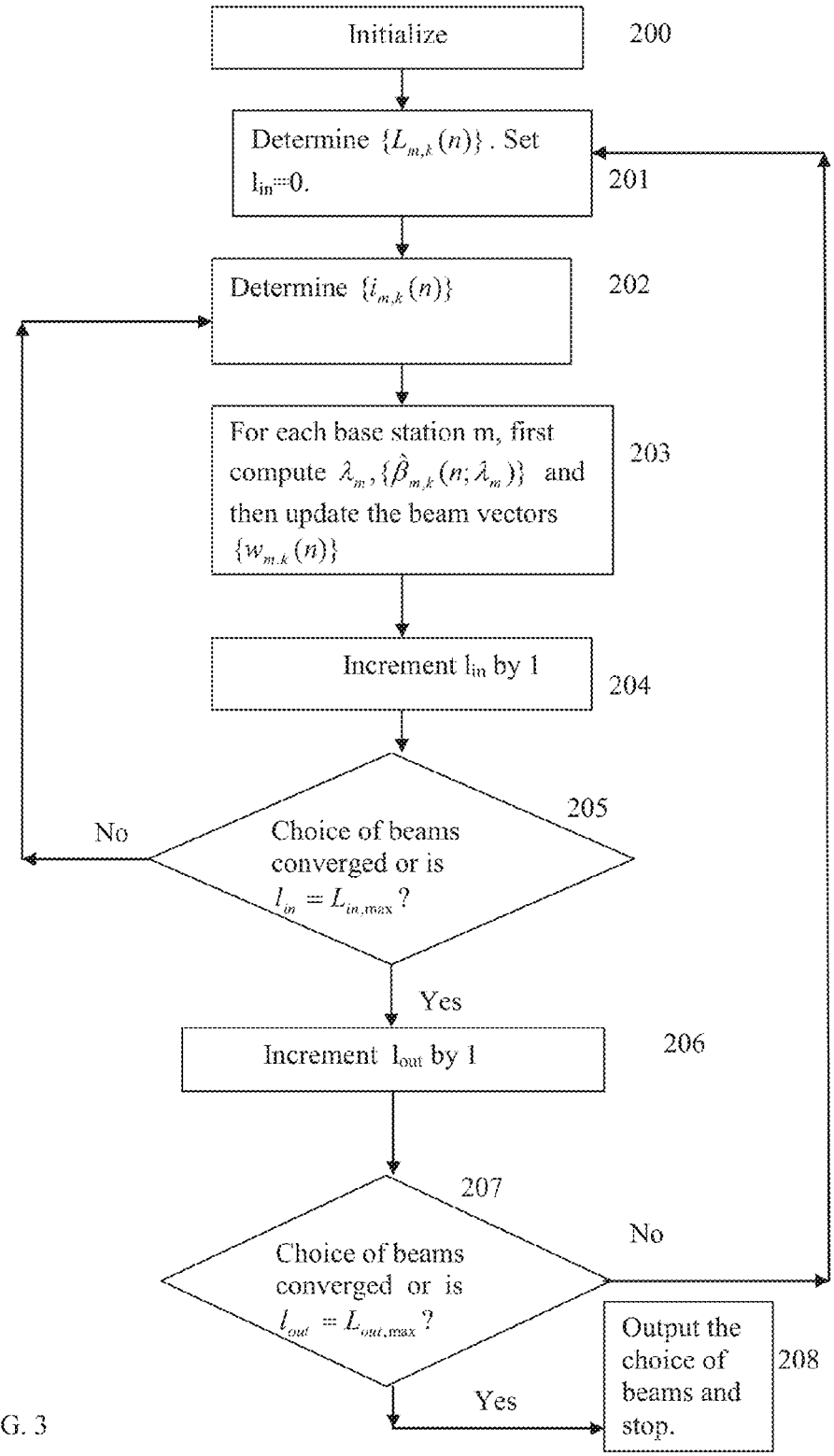
FIG. 3 shows an exemplary beamforming design process which utilizes a derived beamforming structure and solves Karush-Kuhn-Tucker (KKT) equations for the non-convex optimization problem.

FIG. 3 shows an exemplary process which utilizes the derived beamforming structure and solves the Karush-Kuhn-Tucker (KKT) equations for the non-convex optimization problem.

In 200, the system is initialized by obtaining the estimates of all channels, the maximum transmit power of each base station and the priorities of the users. The system selects some initial values for the beam vectors $\{w_{m,k}(n), k \in B_m(n), m=1, \ldots, M, n=1, \ldots N\}$. Moreover, the values of the maximum number of iterations for the inner and outer loops $L_{in,max}$ and $L_{out,max}$, respectively, are selected. Further, the system sets the counter $l_{out}=0$.

Next, in 201, the system sets $l_{in}$ to zero and computes the leakage matrices $\{L_{m,k}(n), k \in B_m(n), m=1, \ldots, M, n=1, \ldots N\}$, where $$L_{m,k}(n) = \sum_{j=1}^{M}\sum_{\substack{u \in B_j(n) \\ (j,u) \neq (m,k)}} P_{j,u}(n)G_{m,u}(n),$$

and $$P_{j,u}(n) = \frac{\alpha_u(n)SINR_{j,u}(n)}{1 + \sum_{l=1}^{m}\sum_{s \in B_l(n)} w_{l,s}^H(n)G_{l,u}(n)w_{l,s}(n)}.$$

In 202, the system determines the scalars $$i_{m,k}(n) = \sum_{l=1}^{M}\sum_{\substack{s \in B_l(n) \\ (l,s) \neq (m,k)}} w_{l,s}^H(n)G_{l,k}(n)w_{l,s}(n),$$

$k \in B_m(n), m=1, \ldots, M, n=1, \ldots N$.

In 203, for each base station in, the system determines $\lambda_m$ and $\{\hat{\beta}_{m,k}(n;\lambda_m), k \in B_m(n), n=1, \ldots N\}$ using $$|\hat{\beta}_{m,k}(n;\lambda_m)|^2 = \frac{\left(\alpha_k(n)h_{m,k}^H(n)\hat{T}_{m,k}^\dagger(n;\lambda_m)h_{m,k}(n) - \hat{i}_{m,k}(n) - 1\right)^+}{\left|h_{m,k}^H(n)\hat{T}_{m,k}^\dagger(n;\lambda_m)h_{m,k}(n)\right|^2}$$

and $$\sum_{n=1}^{N}\sum_{k \in B_m(n)} \frac{\left\|\hat{\beta}_{m,k}(n;\lambda_m)\hat{T}_{m,k}^\dagger(n;\lambda_m)h_{m,k}(n)\right\|^2}{f_m(n;\lambda_m)} = P_{m,max},$$

where $x^+ = \max\{x,0\}$, $\hat{T}_{m,k}(n;\lambda_m) = \hat{L}_{m,k}(n;\lambda_m) + (\lambda_m \ln 2)I_P$ and $(\cdot)^\dagger$ indicates the pseudo-inverse. Notice that $\{\hat{i}_{m,k}(n), \hat{L}_{m,k}(n)\}$ denote the recent-most values of $\{i_{m,k}(n), L_{m,k}(n)\}$ (i.e., the values most-recently updated). Finally, the system updates the beam vectors $\{w_{m,k}(n)\}$ using $w_{m,k}(n) = \hat{\beta}_{m,k}(n;\lambda_m)\hat{T}_{m,k}^\dagger(n;\lambda_m)h_{m,k}(n).$ In 204, $l_{in}$ is incremented. In 205 the system checks if the choice of beams has converged or if $l_{in}=L_{in,max}$. If either of these two conditions is true the process proceeds to 206 else the process loops back to 202, in 206, the process increments $l_{out}$.

In 207, the system checks if the choice of beams has converged or if $l_{out}=L_{out,max}$. If either of these two conditions is true the system jumps to 208 else loops back to 201. In 208, the latest choice of beams is provided as an output and the process ends.

The details of the iterative process of FIG. 3 to solve the KKT conditions are discussed next. It can be shown that the set of KKT conditions for the [problem 1] are given by $$\begin{cases} (L_{m,k}(n) + \lambda_m \ln 2 I_P)w_{m,k}(n) = \frac{\alpha_k(n)G_{m,k}(n)w_{m,k}(n)}{1 + w_{m,k}^H(n)G_{m,k}(n)w_{m,k}(n) + i_{m,k}(n)} & k \in B_m(n), m=1, \ldots, M, n=1, \ldots, N \\ \lambda_m\left[P_{m,max} - \sum_{n=1}^{N}\sum_{k \in B_m(n)} \|w_{m,k}(n)\|^2\right] = 0, & m=1, \ldots, M \\ \sum_{n=1}^{N}\sum_{k \in B_m(n)} \|w_{m,k}(n)\|^2 \leq P_{m,max}, & m=1, \ldots, M \end{cases} \quad [KKT\ 1]$$

Notice that, if $w_{m,k}(n) \neq 0$ and $\lambda_m \neq 0$, then $h_k^H(n)w_{m,k}(n) \neq 0$ and $h_{m,k}(n) \propto (L_{m,k}(n) + \lambda_m \ln 2I_P)w_{m,k}(n)$. Therefore, a non-zero beam-vector which satisfies the above KKT conditions must be of the form $w_{m,k}(n) \propto (L_{m,k}(n) + \lambda_m \ln 2I_P)^{-1}h_{m,k}(n)$. On the other hand, if $w_{m,k}(n) \neq 0$, $\lambda_m = 0$ is feasible only if one of the following two conditions holds:

$$h_{m,k}^H(n)w_{m,k}(n) = 0 \text{ and } L_{m,k}(n)w_{m,k}(n) = 0;\quad \text{C1}$$

$$h_{m,k}(n) \in \text{range}\{L_{m,k}(n)\}.\quad \text{C2}$$

If C1 is satisfied, then user $k \in B_m(n)$ receives no information from the serving base station. On the other hand, if C2 holds and $\lambda_m = 0$, a non-zero beam-vector which satisfies the KKT conditions must be of the form $w_{m,k}(n) \propto L_{m,k}^\dagger(n)h_{m,k}(n)$. Let $T_{m,k}(n;\lambda_m) = L_{m,k}(n) + (\lambda_m \ln 2)I_P$, then the optimal non-zero beam-vectors are of the form $w_{m,k}(n) = \beta_{m,k}(n;\lambda_m)T_{m,k}^\dagger(n;\lambda_m)h_{m,k}(n)$, $k \in B_m(n)$, $m = 1, \ldots, M$, $n = 1, \ldots N$, where $\lambda_m \geq 0$ and $\beta_{m,k}(n;\lambda_m) > 0$ are constants to be determined. Also, $\lambda_m = 0$ is feasible only if $h_{m,k}(n) \in \text{range}\{L_{m,k}(n)\}$ for $k \in B_m(n)$ and $n = 1, \ldots, N$.

If $w_{m,k}(n) \neq 0$, the following is obtained:

$$\alpha_k(n)h_{m,k}(n)T_{m,k}^\dagger(n;\lambda_m)h_{m,k}(n) = 1 + i_{m,k}(n) + |\beta_{m,k}(n;\lambda_m)|^2|h_{m,k}^H(n)T_{m,k}^\dagger(n;\lambda_m)h_{m,k}(n)|^2, k \in B_m(n), m = 1, \ldots, M, n = 1, \ldots N,$$

and $$\sum_{n=1}^{N} \sum_{k \in B_m(n)} \|\beta_{m,k}(n;\lambda_m)T_{m,k}^\dagger(n;\lambda_m)h_{m,k}(n)\|^2 \leq P_{m,max},$$

$$m = 1, \ldots, M.$$

The procedure to solve the KKT system is as follows. If some previous feasible vectors $\{\hat{w}_{m,k}(n)\}$ are given, then $\{\hat{i}_{m,k}(n)\}$ and $\{\hat{L}_{m,k}(n)\}$ can be computed. The new values of $\{\hat{\beta}_{m,k}(n;\lambda_m)\}$ can now be computed as $$|\hat{\beta}_{m,k}(n;\lambda_m)|^2 = \frac{(\alpha_k(n)h_{m,k}^H(n)\hat{T}_{m,k}^\dagger(n;\lambda_m)h_{m,k}(n) - \hat{i}_{m,k}(n) - 1)^\dagger}{|h_{m,k}^H(n)\hat{T}_{m,k}^\dagger(n;\lambda_m)h_{m,k}(n)|^2},$$

for $k \in B_m(n)$, $m = 1, \ldots, M$ and $n = 1, \ldots, N$. The new value of $\lambda_m$ can be computed as the solution to $$\sum_{n=1}^{N} \sum_{k \in B_m(n)} \underbrace{\|\hat{\beta}_{m,k}(n;\lambda_m)\hat{T}_{m,k}^\dagger(n;\lambda_m)h_{m,k}(n)\|^2}_{f_m(n;\lambda_m)} = P_{m,max}.$$

In order to solve the above equation, notice that $f_m(n;\lambda_m)$ is a monotonic decreasing function of $\lambda_m > 0$, for $m = 1, \ldots, M$. Moreover, the optimal set of dual variables $\lambda_1, \ldots, \lambda_M$ must satisfy the following inequalities:

$$0 \leq \lambda_m \ln 2 \leq \max_{n \in \{1, \ldots, N\}} \max_{k \in B_m(n)} \alpha_k(n)\|h_{m,k}(n)\|^2, \quad m = 1, \ldots, M.$$

Hence, the search for $\lambda_m$ can be efficiently solved via one-dimensional bisection. If no positive solution exists, then $\lambda_m$ is set to zero: in this case, base station m does not use all available power for transmission. After computing the new values of $\{\lambda_m\}$ and $\{\beta_{m,k}(n;\lambda_m)\}$, the beam-vectors are updated and the process is iterated until convergence. This process is called the Iterative Coordinated Beam-Forming (ICBF) process. One exemplary pseudo code for the ICBF is as follows:

```
1: Initialize L_{in,max}, L_{out,max}, {w_{m,k}(n), k ∈ β_m(n),
     m = 1, ..., M, n = 1, ..., N}
2: l_{out} = 0
3: repeat
4:     Compute {L_{m,k}(n), k ∈ β_m(n), m = 1, ..., M, n = 1, ..., N}
5:     l_{in} = 0
6:     repeat
7:         Compute {l_{m,k}(n), k ∈ β_m(n), m = 1, ..., M, n = 1, ..., N}
8:         for m = 1 to M do
9:             Compute λ_m and {β̂_{m,k}(n, λ_m), k ∈ β_m(n), n = 1, ..., N}
10:            Update {w_{m,k}(n), k ∈ β_m(n), n = 1, ..., N}
11:        end for
12:        l_{in} = l_{in} + 1
13:    until convergence or l_{in} = L_{in,max}
14:    l_{out} = l_{out} + 1
15: until convergence or l_{out} = L_{out,max}
```

Next, a distributed implementation of the ICBF process is discussed which requires limited channel state information at each base station and some inter base station message passing. The co-channel interference received at terminal $k \in B_m(n)$ on slot n can be expanded as $$i_{m,k}(n) = \underbrace{\sum_{\substack{u \in B_m(n) \\ u \neq k}} w_{m,u}^H(n)G_{m,k}(n)w_{m,u}(n)}_{i_{m,k}^{in}(n)} + \underbrace{\sum_{\substack{j=1 \\ j \neq m}}^{M} \sum_{u \in B_j(n)} w_{j,u}^H(n)G_{j,k}(n)w_{j,u}(n)}_{\underbrace{\phantom{XX}}_{i_{m,k}^{out}(n)}^{i_{m,k}^{out,j}(n)}},$$

where the terms $i_{m,k}^{in}(n)$ and $i_{m,k}^{out}(n)$ account for in-cell and out-cell interference, respectively. Similarly, the leakage matrix of terminal $k \in B_m(n)$ on slot n becomes $$L_{m,k}(n) = \underbrace{\sum_{\substack{u \in B_m(n) \\ u \neq k}} P_{m,u}(n)G_{m,u}(n)}_{L_{m,k}^{in}(n)} + \underbrace{\sum_{\substack{j=1 \\ j \neq m}}^{M} \sum_{u \in B_j(n)} P_{j,u}(n)G_{m,u}(n)}_{\underbrace{\phantom{XX}}_{L_m^{out}(n)}^{L_m^{out,j}(n)}},$$

where the terms $L_{m,k}^{in}(n)$ and $L_m^{out}(n)$ account for in-cell and out-cell leakages, respectively, and $$P_{m,u}(n) = \frac{\alpha_u(n)w_{m,u}^H(n)G_{m,u}(n)w_{m,u}(n)}{(1 + i_{m,u}(n))(1 + i_{m,u}(n) + w_{m,u}^H(n)G_{m,u}(n)w_{m,u}(n))}.$$

Base station m can compute $\{i_{m,k}^{in}(n), k \in B_m(n), n = 1, \ldots, N\}$ based only on the knowledge of the local forward channels $\{h_{m,k}(n), k \in B_m(n), n = 1, \ldots, N\}$ and of the local beam-vectors $W_m = \{w_{m,k}(n), k \in B_m(n), n = 1, \ldots, N\}$ computed at the previous iteration. Furthermore, assume that base station m has received at the end of the previous iteration the quantities $\{i_{m,k}^{out,j}(n), k \in B_m(n), n = 1, \ldots, N\}$ and $\{L_m^{out}(n), n = 1, \ldots, N\}$ from every other coordinated base station $j \neq m$. Then, the base station m can locally update its beam-vectors $W_m$ as discussed above.

Once the new beam vectors are computed, each base station can first update the quantities $$i_{\ell,s}^{out,m}(n) = \sum_{u \in B_m(n)} w_{m,u}^H(n) G_{m,s}(n) w_{m,u}(n), \ \ell \neq m, s \in B_\ell(n),$$

and pass them to the other coordinated base stations. Upon receiving $\{i_{m,k}^{out,j}(n)\}$ from all $j \neq m$ and updating $P_{m,u}(n)$, base station m can determine $$L_\ell^{out,m}(n) = \sum_{u \in B_m(n)} P_{m,u} G(n)_{\ell,u}(n), \ \ell \neq m,$$

which are then passed to the other coordinated base stations for the next iteration. The base station m needs the knowledge of the forward channels to the other coordinated cells and of the forward channels from the other coordinated cells.

Notice that a set of $\{i_{m,k}(n), L_{m,k}(n)\}$ and beam-vectors $W_m$ that satisfy [KKT 1], must also satisfy the KKT conditions of the following M optimization problems (one for each base station) where $\{i_{m,k}(n), L_{m,k}(n)\}$ are held fixed $$\max_{W_m} \sum_{n=1}^{N} \sum_{k \in m(n)} \alpha_k(n) \log_2\left(1 + \frac{w_{m,k}^H(n) G_{m,k}(n) w_{m,k}(n)}{1 + i_{m,k}(n)}\right) - \frac{w_{m,k}^H(n) L_{m,k}(n) w_{m,k}(n)}{\ln 2}$$

$$\text{s.t.} \sum_{n=1}^{N} \sum_{k \in B_m(n)} \|w_{m,k}(n)\|^2 \leq P_{m,max}$$

For m=1, ..., M, the above pro Item is equivalent to a second-order cone program (SOCP) convex optimization problem. Consequently, at each base station m an optimal set of beam vectors $W_m$ can also be determined by using a SOCP solver.

Next, the initialization of the ICBF process is discussed. Implementing the ICBF process requires choosing an initial feasible set of beam-vectors. Three initial solutions can be used where the available power is equally splits across beams.

The first is called Channel-Matched (CM) Beamforming. Neglecting in-cell and inter-cell interference, the system selects the initial beam vectors matched to the users' channel:

$$w_{m,k}(n) = \sqrt{\frac{P_{m,max}}{NQ}} \frac{h_{m,k}(n)}{\|h_{m,k}(n)\|},$$

for $k \in B_m(n)$, m=1, ..., M and n=1, ..., N.

The second is called In-Cell Zero-Forcing (ICZF) Beamforming. If $P \geq Q$, the initial set of beams can be designed so as to eliminate the in-cell interference, i.e., $$w_{m,k}(n) \propto \left(\sum_{u \in B_m(n)} h_{m,u}(n) h_{m,u}^H(n)\right)^\dagger h_{m,k}(n),$$

for $k \in B_m(n)$, m=1, ..., M and n=1, ..., N. The proportionality constant is chosen to meet the power constraint. If P<Q, in-cell interference cannot be forced to zero anymore. However, the above equation is still a wise beamformer choice since it maximizes the ratio between the useful signal and the in-cell leakage for any user $k \in B_m(n)$.

The third alternative is the Maximum Signal-to-Leakage-plus-Noise Ratio (MSLNR) Beamforming. For any user $k \in B_m(n)$ the SLNR on slot n can be defined as $$SLNR_{m,k}(n) = \frac{\overbrace{w_{m,k}^H(n) G_{m,k}(n) w_{m,k}(n)}^{\text{useful signal for user k on slot n}}}{\sum_{j=1}^{M} \sum_{\substack{u \in B_j(n) \\ (j,u) \neq (m,k)}} \underbrace{w_{m,k}^H(n) G_{m,u}(n) w_{m,k}(n)}_{\text{leakage to user u on slot n}} + 1}.$$

$w_{m,k}(n)$ is designed to maximize $SLNR_{m,k}(n)$ subject to a norm constraint:

$$w_{m,k}(n) = \underset{x \in C^P}{\arg\max} \frac{x^H G_{m,k}(n) x}{x^H D_{m,k}(n) x}, \text{ s.t.} \|x\|^2 = \frac{P_{m,max}}{NQ}, \text{ where}$$

$$D_{m,k}(n) = \sum_{j=1}^{M} \sum_{\substack{u \in B_j(n) \\ (j,u) \neq (m,k)}} G_{m,u}(n) + I_P \frac{NQ}{P_{m,max}}.$$

This is a standard problem whose solution is the generalized eigenvector corresponding to the maximum generalized eigenvalue of the matrix pair $(G_{m,k}(n), D_{m,k}(n))$.

The foregoing implementations of the ICBF process are referred to as ICBF-CM or ICBF-ICZF or ICBF-MSLNR.

If the coordinated base stations share both user data and channel state information, then they can act as a unique large array with distributed antenna elements and this case is the fully-connected cluster (FCC). An FCC encompassing $\tilde{M}$ base stations, each one equipped with $\tilde{P}$ transmit antennas and where power pooling across base stations is possible, is mathematically equivalent to a PCC with M=1 and $P=\tilde{M}\tilde{P}$. For such an FCC the optimal weighted sum rate is obtained using dirty-paper coding (DPC) and can be determined. Applying the ICBF algorithm (to the equivalent PCC model) the system can obtain a locally optimal solution.

The ICBF process can be generalized to an FCC architecture with power polling and a weighted sum-power constraint across base stations. This may be attractive when the coordinated base stations pay unequal prices for transmit power: in this latter case, a larger weight can be given to a base station which has a stricter transmit power limitation.

The ICBF process can be also generalized to an equivalent MISO system wherein each mobile user has multiple-receive antennas and performs rank-one receive beamforming before detection. Details are given in the following.

Let $N_k$ be the number of receive antennas of user k. Then, the signal received by user $k \in B_m(n)$ on slot n is given by $$\tilde{r}_k(n) = \sum_{j=1}^{M} \tilde{H}_{j,k}(n) x_j(n) + \tilde{q}_k(n) \in C^{N_k},$$

where $\tilde{H}_{j,k}(n) \in C^{N_k \times P}$ is the channel matrix between base station j and user k on slot n (which includes small-scale fading, large-scale fading and path attenuation), $x_j(n) \in C^P$ is the signal transmitted by base station m on slot n and $\tilde{q}_k(n) \in C^{N_k}$ is the additive circularly-symmetric Gaussian noise with covariance matrix $\sigma_k^2(n) I_{N_k}$. Upon defining $r_k(n) = \tilde{r}_k(n)/\sigma_k(n)$, $q_k(n) = \tilde{q}_k(n)/\sigma_k(n)$ and $H_k(n) = \tilde{H}_k(n)/\sigma_k(n)$, the following is obtained $$r_k(n) =$$

$$\underbrace{H_{m,k}(n)w_{m,k}(n)b_{m,k}(n)}_{\text{useful signal}} + \underbrace{\sum_{j=1}^{M} \sum_{\substack{u \in B_j(n) \\ (j,u) \neq (m,k)}} H_{m,k}(n)w_{j,u}(n)b_{j,u}(n)}_{\text{co-channel interference}} + \underbrace{q_k(n)}_{\text{noise}} \in C^{N_k}.$$

Assume now that a receive beamforming vector $u_k(n) \in C^{N_k}$, with unit-norm, is employed by user k on slot n. The corresponding output signal $y_k(n) = u_k^H(n) r_k(n)$ is written as $$y_k(n) = \underbrace{h_{m,k}^H(n) w_{m,k}(n) b_{m,k}(n)}_{\text{useful signal}} + \underbrace{\sum_{j=1}^{M} \sum_{\substack{u \in B_j(n) \\ (j,u) \neq (m,k)}} h_{j,k}^H(n) w_{j,u}(n) b_{j,u}(n)}_{\text{co-channel interference}} + \underbrace{z_k(n)}_{\text{noise}},$$

where $h_{m,k}^H(n) = u_k^H(n) H_{m,k}(n) \in C^{1 \times P}$, and $z_k(n) = u_k^H(n) q_k(n) \in C$. This is an equivalent MISO signal model.

In the equivalent MISO system model, the transmit linear filters and the receive linear filters can be iteratively designed as follows:

For any given choice of the receive linear filters $\{u_k(n), k \in B_m(n), m=1, \ldots, M, n=1, \ldots N\}$, the transmit linear filters $\{w_{m,k}(n), k \in B_m(n), m=1, \ldots, M, n=1, \ldots N\}$ can be optimized according to the ICBF algorithm described in FIG. 3.

Also, for a given choice of the transmit linear filters $\{w_{m,k}(n), k \in B_m(n), m=1, \ldots, M, n=1, \ldots N\}$, the receive linear filters $\{u_k(n), k \in B_m(n), m=1, \ldots, M, n=1, \ldots N\}$ can be chosen so as to maximize the weighted sum-rate. In particular, the optimal receive filters must minimize the mean square estimation error and are given by:

$$u_k(n) \propto \left( \sum_{j=1}^{M} \sum_{u \in B_j(n)} H_{m,k}(n) w_{j,u}(n) w_{j,u}^H(n) H_{m,k}^H(n) + I_{N_k} \right)^{-1} H_{m,k}(n) w_{m,k}(n),$$

where u=k is not included in the summation and the proportionality constant is chosen to have $\|u_k(n)\|=1$.

Embodiment II

MIMO-System

Next, a MIMO embodiment is discussed. The MIMO system includes a downlink cellular network with universal frequency reuse where a cluster of M coordinated base stations simultaneously transmit on N orthogonal (in the time or frequency or code domain) resource slots during each scheduling interval. Each base station is equipped with P antennas and SDMA is employed to serve multiple mobiles (each having multiple receive antennas) on a resource slot. Let $N_k$ be the number of receive antennas of user k. Each user is served by only one base station and coordinated base stations only exchange channel quality measurements and this scenario is referred to as a partially-connected cluster (PCC). Let $B_m(n)$ be the set of terminals scheduled by base station m on slot n, for m=1, . . . , M and n=1, . . . , N. For simplicity and without loss of generality, the assumption is that $|B_m(n)|=Q$ $\forall m,n$ and $B_{m_1}(n_1) \cap M_{m_2}(n_2) = \emptyset$ for $m_1 \neq m_2$.

With linear precoding, the signal transmitted by base styion m on slot n is expressed as $$x_m(n) = \sum_{k \in B_m(n)} W_{m,k}(n) b_{m,k}(n) \in C^P,$$

where $b_{m,k}(n) \in C^{D_{m,k}(n)}$ is the complex symbol vector transmitted by base station m on slot n to user $k \in B_m(n)$ using the precoder matrix $W_{m,k}(n) \in C^{P \times D_{m,k}(n)}$, and $1 \leq D_{m,k}(n) \leq P$ indicates the number of data stream delivered to user $k \in B_m(n)$ on slot n by base station m. Also, the assumption is $E[b_{m,k}(n) b_{m,k}^H(n)] = I_{D_{m,k}(n)}$, $E[b_{m_1,k_1}(n_1) b_{m_2,k_2}^H(n_2)] = 0_{D_{m,k}(n)}$ for $(n_1, m_1, k_1) \neq (n_2, m_2, k_2)$, and $$\sum_{n=1}^{N} \sum_{k \in B_m(n)} tr(W_{m,k}(n) W_{m,k}^H(n)) \leq P_{m,max},$$

where tr(.) denotes the trace operation.

Let $\tilde{H}_{j,k}(n) \in C^{N_k \times P}$ be the channel matrix between base station j and user k on slot n, which includes small-scale fading, large-scale fading and path attenuation. The signal received by user $k \in B_m(n)$ on slot n is given by $$\tilde{y}_k(n) = \sum_{j=1}^{M} \tilde{H}_{j,k}(n) x_j(n) + \tilde{z}_k(n),$$

where $\tilde{z}_k(n) \in C^{N_k}$ is the additive circularly-symmetric Gaussian noise with covariance matrix $\sigma_k^2(n) I_{N_k}$: here, different levels account for different co-channel interference and different noise figures of the receivers. To simplify notation, the received signal is normalized by the noise standard deviation. Upon defining $y_k(n) = \tilde{y}_k(n)/\sigma_k(n)$, $z_k(n) = \tilde{z}_k(n)/\sigma_k(n)$ and $H_k(n) = \tilde{H}_k(n)/\sigma_k(n)$, the following is derived:

$$y_k(n) = \underbrace{H_{m,k}(n) W_{m,k}(n) b_{m,k}(n)}_{\text{useful signal}} + \underbrace{\sum_{j=1}^{M} \sum_{\substack{u \in B_j(n) \\ (j,u) \neq (m,k)}} H_{j,k}(n) W_{j,u}(n) b_{j,u}(n)}_{\text{co-channel interference}} + \underbrace{z_k(n)}_{\text{noise}}.$$

Moreover, let $Q_{j,u}(n) = W_{j,u}(n) W_{j,u}^H(n) \in C^{P \times P}$, so that the covariance matrix of the co-channel interference plus noise seen by user $k \in B_m(n)$ on slat n, denoted by $R_{m,k}(n)$, can be expressed as $$R_{m,k}(n) = \sum_{j=1}^{M} \sum_{\substack{u \in B_j(n) \\ (j,u) \neq (m,k)}} H_{j,k}(n) Q_{j,u}(n) H_{j,k}^H(n) + I_{N_k}.$$

Let $\overline{Q}$ denote the set of all $P \times P$ positive semi-definite matrices in $C^{P \times P}$. Let $Q = \{Q_{m,k}(n) \in \tilde{Q}, k \in B_m(n), m=1, \ldots, M, n=1, \ldots N\}$ indicate the collection of the positive-semidefinite covariance matrices. Q is designed so as to maximize the (instantaneous) weighted system sum-rate, Assuming Gaussian inputs and single-user detection at each mobile, the problem to be solved is as follows:

$$\operatorname*{argmax}_{Q} \sum_{n=1}^{N} \sum_{m=1}^{M} \sum_{k \in B_m(n)} \alpha_k(n) \log_2 |I_{N_k} + H_{m,k}(n) Q_{m,k}(n) H_{m,k}^H(n) R_{m,k}(n)^{-1}|,$$

$$\text{s.t.} \sum_{n=1}^{N} \sum_{k \in B_m(n)} tr(Q_{m,k}(n)) \leq P_{m,max}, m = 1, \ldots, M,$$

where $|.|$ denotes the determinant of its matrix argument, $\alpha_k(n) > 0$ is the priority assigned by the scheduler to user k on slot n. If $\alpha_k(n) = 1/(NM)$, the objective function becomes the network sum-rate (measured in bits/channel-use/slot/cell). More generally, the scheduler may adjust the coefficients $\{\alpha_k(n)\}$ over time to maintain proportional fairness among terminals.

Next, the first-order necessary conditions for the optimal solutions to the above equations, namely the Karush-Kuhn-Tucker (KKT) conditions are discussed. Consider the Lagrangian of the optimization problem dualized with respect to the sum-power constraints and positivity constraints:

$$\Lambda(Q, \lambda) = \sum_{n=1}^{N} \sum_{m=1}^{M} \sum_{k \in B_m(n)} \frac{\alpha_k(n)}{\ln 2} \ln|I_{N_k} + H_{m,k}(n) Q_{m,k}(n) H_{m,k}^H(n) R_{m,k}(n)^{-1}| +$$

$$\sum_{m=1}^{M} \lambda_m \left[ P_{m,max} - \sum_{n=1}^{N} \sum_{k \in B_m(n)} tr(Q_{m,k}(n)) \right] +$$

$$\sum_{m=1}^{M} \sum_{n=1}^{N} \sum_{k \in B_m(n)} tr(Q_{m,k}(n) \Delta_{m,k}(n)),$$

where $\lambda = (\lambda_1, \ldots, \lambda_M)^T$ is the vector of non-negative Lagrangian multipliers associated to the transmit power constraints and $\{\Delta_{m,k}(n)\}$ are the Lagrangian multipliers associated with the positive semi-definite constraints on $\{Q_{m,k}(n)\}$.

Also, define the following leakage matrix $L_{m,k}(n) \in C^{P \times P}$ $$L_{m,k}(n) = \sum_{j=1}^{M} \sum_{\substack{u \in B_j(n) \\ (j,u) \neq (m,k)}} \frac{\alpha_u(n)}{\ln(2)} H_{m,u}^H(n)$$

$$\left( (R_{j,u}(n))^{-1} - (R_{j,u}(n) + H_{j,u}(n) Q_{j,u}(n) H_{j,u}^H(n))^{-1} \right) H_{m,u}(n),$$

which accounts for the interference caused by base station m to other co-channel terminals on tone n when serving user $k \in B_m(n)$. By setting the gradient of $\Lambda(Q,\lambda)$ with respect to $Q_{m,k}(n)$ equal to zero, the following set of equalities are obtained:

$$L_{m,k}(n) + \ln 2 (\lambda_M I_P - \Delta_{m,k}(n)) = \alpha_k(n) H_{m,k}^H(n) (R_{m,k}(n) + H_{m,k}(n) Q_{m,k}(n) H_{m,k}^H(n))^{-1} H_{m,k}(n), k \in B_m(n),$$
$$m=1,\ldots,M, n=1,\ldots,N$$

The above equations, along with the sum-power constraints in the prior equation, the positivity constraints and the following complementary slackness conditions:

$$\lambda_m \left[ P_{m,max} - \sum_{n=1}^{N} \sum_{k \in B_m(n)} tr(Q_{m,k}(n)) \right] = 0,$$

$$m = 1, \ldots, M,$$

$$tr(Q_{m,k}(n) \Delta_{m,k}(n)) = 0, k \in B_m(n), m=1,\ldots,M, n=1,\ldots,N,$$

form a set of first-order necessary conditions for optimality, namely the KKT conditions.

The precoder matrices can be obtained in a distributed way as follows. The system is initialized with a choice of $\{Q_{m,k}(n)\}$ using which $\{L_{m,k}(n)\}$ and $\{R_{m,k}(n)\}$ are determined. The system implements two loops. In the inner loop the system solves the following convex optimization problem at each base-station in, for a given $\{L_{m,k}(n)\}$ and $\{R_{m,k}(n)\}$:

[problem 2]
$$\operatorname*{argmax}_{\{Q_{m,k}(n)\}} \sum_{n=1}^{N} \sum_{k \in B_m(n)} [\alpha_k(n) \log_2 |I_{N_k} + H_{m,k}(n) Q_{m,k}(n) H_{m,k}^H(n) R_{m,k}(n)^{-1}| - tr(L_{m,k}(n) Q_{m,k}(n))],$$

$$\text{s.t.} \sum_{n=1}^{N} \sum_{k \in B_m(n)} tr(Q_{m,k}(n)) \leq P_{m,max}, Q_{m,k}(n) \in \overline{Q},$$

$$\forall k \in B_m(n), \forall n$$

Upon obtaining $\{Q_{m,k}(n)\}$, the matrices $\{R_{m,k}(n)\}$ are updated and the problem [problem 2] is again solved at each base station. The inner loop (for a fixed set of leakage matrices $\{L_{m,k}(n)\}$) is repeated till convergence or a maximum number of iteration is achieved. Then the leakage matrices $\{L_{m,k}(n)\}$ are updated in the outer loop and the inner loop which involves updating $\{Q_{m,k}(n)\}$ using [problem 2] and $\{R_{m,k}(n)\}$ is initiated again. The outer loop itself is repeated till convergence or till a maximum number is reached.

In the following, this process is referred to as Iterative Coordinated Linear Precoding (ICLP).

If the coordinated base stations share both user data and channel state information, then they can act as a unique large array with distributed antenna elements and this case is the fully-connected cluster (FCC). An FCC encompassing $\tilde{M}$ base stations, each one equipped with $\tilde{P}$ transmit antennas and where power pooling across base stations is possible, is mathematically equivalent to a PCC with M=1 and $P=\tilde{M}\tilde{P}$. For such an FCC the optimal weighted sum rate is obtained using dirty-paper coding (DPC) and can be determined. Applying the ICLP algorithm (to the equivalent PCC model) the system can obtain a locally optimal solution.

For initialization, the system can extend the Maximum Signal-to-Leakage-plus-Noise Ratio (MSLNR) Beamforming to Maximum Signal-to-Leakage-plus-Noise Ratio (MSLNR) precoding. For any user $k \in B_m(n)$ the precoder or equivalently the covariance matrix can be obtained by maximizing $$\frac{\overbrace{tr(H_{m,k}(n)Q_{m,k}(n)H_{m,k}^H(n))}^{\text{useful signal strength for user k on slot n}}}{\sum_{j=1}^{M} \sum_{\substack{u \in B_j(n) \\ (j,u) \neq (m,k)}} \underbrace{tr(H_{m,u}(n)Q_{m,k}(n)H_{m,u}^H(n))}_{\text{leakage to user u on slot n}} + 1}.$$

Obtaining Channel State Information:

The design procedures described in the above embodiments need channel estimates at each base station. In frequency division duplex (FDD) systems, each user can first obtain estimates of the (effective) channel matrices using common pilots transmitted by its serving base station as well as the dominant interfering base stations. The system can use a common pilot which can be a reference signal whose form or structure is known in advance to all users. For instance, user k served by base station m can determine estimates of $\{H_{m,k}(n)\}$ for a few resource slots using common pilots transmitted by base station k on those slots and then interpolate to obtain channel estimates for the remaining slots. Similarly, estimates of $\{H_{j,k}(n)\}$ corresponding to an interfering base station j can be obtained using common pilots transmitted by base station j. The user should know the slots (or positions in time and/or frequency) where these common pilots are transmitted. For simplicity in channel estimation, the common pilots transmitted by adjacent base stations as well as those transmitted via different antennas of the same base station could be kept orthogonal using non-intersecting positions or via (near) orthogonal spreading sequences. The obtained estimates can then be quantized by the user and reported back to the serving base station via a uplink feedback channel.

On the other hand in time division duplex (TDD) systems channel reciprocity can be exploited. Based on common pilots transmitted by user k, its serving base station m can obtain estimates of $\{H_{m,k}(n)\}$. Using the same pilots an interfering base station j can obtain estimates of $\{H_{j,k}(n)\}$ which it can then quantize and send to base station m.

A key practical problem in coordinated beamforming and scheduling is that of the channel estimates getting outdated. In particular, due to the delay between the time when a set of channel estimates are determined (by users or base stations) and the time when some or all of the users are scheduled for data transmission based on those estimates, henceforth referred to as the scheduling delay, the channels seen by the scheduled users could have significantly changed and consequently the rates assigned to them may not be achievable which can adversely affect the system throughput.

One way to mitigate the aforementioned problem is as follows. The scheduling delay is a function of the backhaul latency associated with the inter-base station signaling as well as the scheduler implementations at the base stations. The average value of the scheduling delay can be tracked by each base station. In FDD systems, each base station can then broadcast its measured value to all the users that can be served by it, once in every several scheduling intervals. Upon receiving this value each user can employ any suitable prediction algorithm to obtain a predicted channel estimates. In particular, suppose the average scheduling delay value is D. Then, user k can first determine estimates of $\{H_{m,k}(n)\}, \{H_{j,k}(n)\}_{j \neq m}$ corresponding to time t and then obtain predicted estimates which are its estimates of channels for time t+D. The user can quantize and feedback these predicted channels. Moreover, the UE can monitor the quality of its prediction over a time window. If it finds that the prediction quality is poor due to its mobility or other factors, it can inform its serving base station which can take appropriate action such as dropping it from the set of users that are served via coordinated beamforming. In TDD systems the prediction can be done by the base station itself. The predicted estimates are then used in the beamforming or precoding design procedure.

The above embodiments address inter-cell interference mitigation in a MISO or MIMO wireless cellular network with universal frequency reuse. Each base station is equipped with multiple transmit antennas and space-division multiple-access (SDMA) is employed to serve multiple co-channel users. The set of beamforming vectors or precoding matrices across a cluster of coordinated cells and resource slots are designed so as to maximize the (instantaneous) weighted system sum-rate subject to per-base-station power constraints.

In a MISO system each user is equipped with a single receive antenna and receives a single data stream from its serving base station. An Iterative Coordinated Beam-Forming (ICBF) algorithm is provided to design the transmit beamforming vectors. The ICBF algorithm can also be applied in an equivalent MISO network model wherein each user is equipped with multiple receive antennas and performs rank-one receive beamforming before detection. Numerical results indicate that the proposed ICBF technique significantly improves throughput with respect to uncoordinated beamforming strategies and achieves a large fraction of capacity. Also, power balancing across multiple resource slots is quite beneficial in a PCC scenario, while providing only marginal gains in an FCC scenario.

In a MIMO system each user may have multiple receive antennas and may receive multiple spatially-multiplexed data streams. An Iterative Coordinated Linear Precoding (ICLP) Algorithm is provided to design the transmit precoding matrices.

The proposed ICBF and ICLP algorithms admit a distributed implementation and are general enough to be used both in a partially-connected cluster (PCC), wherein the coordinated base stations do not share data symbols and optimize their local beams based on the inter-cell channel gains only, and in a fully-connected cluster (FCC), wherein coordinated base stations act as a unique large array with distributed antenna elements. Distributed implementations with reduced signaling among base stations can also be done, and the system works robustly even with imperfect channel knowledge.

The above process enhances a multi-cell wireless network with universal frequency reuse and treats the problem of co-channel interference mitigation in the downlink channel. Assuming that each base station serves multiple single-antenna mobiles via space-division multiple-access (SDMA), the system jointly optimizes the linear beam-vectors or precoding matrices across a set of coordinated cells and resource slots: the objective function to be maximized is the weighted system sum-rate subject to per-base-station power constraints. After deriving the general structure of the optimal beam-vectors, the iterative process solves the Karush-Kuhn-Tucker (KKT) conditions of the non-convex primal problem. Various approaches can be used to choose the initial beam-vectors, one of which maximizes the signal-to-leakage-plus-noise ratio. Simulation results are discussed in the incorporated by reference provisional application to assess the performance of the process.

What is claimed is:

1. A multiple-input multiple-output (MIMO) wireless communications system, comprising:
    a mobile station that is served by a single serving base station;
    a plurality of coordinated base stations that include the single serving base station,
    wherein the mobile station includes a plurality of receive antennas,
    wherein the MIMO wireless communications system determines an initial feasible set of precoders,
    wherein the MIMO wireless communications system performs rank-one downlink precoding,
    wherein the mobile station detects signals transmitted from the single serving base station under the assumption of rank-one, and
    wherein the MIMO wireless communications system comprises an equivalent multiple-input single-output (MISO) wireless communications system.

2. The MIMO wireless communications system of claim 1, wherein the MIMO wireless communications system performs maximum signal-to-leakage-plus-noise ratio (MSLNR) beamforming to determine the initial feasible set of precoders.

3. The MIMO wireless communications system of claim 1, wherein the plurality of coordinated base stations exchange a channel quality measurement.

4. The MIMO wireless communications system of claim 1, wherein the MIMO wireless communications system determines a structure for a downlink precoder by optimizing a weighted sum-rate across multiple resource slots in at least one of time, frequency, and code domains.

5. A method implemented in a base station used in a multiple-input multiple-output (MIMO) wireless communications system, comprising:
    performing rank-one downlink precoding for a mobile station; and
    determining an initial feasible set of precoders for the mobile station,
    wherein the base station is one of a plurality of coordinated base stations,
    wherein the base station comprises a single serving base station for a mobile station,
    wherein the mobile station includes a plurality of receive antennas,
    wherein the mobile station detects signals transmitted from the single serving base station under the assumption of rank-one, and
    wherein the MIMO wireless communications system comprises an equivalent multiple-input single-output (MISO) wireless communications system.

6. The method of claim 5, wherein the MIMO wireless communications system performs maximum signal-to-leakage-plus-noise ratio (MSLNR) beamforming to determine the initial feasible set of precoders.

7. The method of claim 5, wherein the plurality of coordinated base stations exchange a channel quality measurement.

8. The method of claim 5, further comprising:
    determining a structure for a downlink precoder by optimizing a weighted sum-rate across multiple resource slots in at least one of time, frequency, and code domains.

9. A method implemented in a mobile station used in a multiple-input multiple-output (MIMO) wireless communications system, comprising:
    performing rank-one receive beamforming; and
    detecting signals transmitted from the single serving base station under the assumption of rank-one,
    wherein the mobile station includes a plurality of receive antennas,
    wherein the mobile station is served by a single serving base station,
    wherein the single serving base station is one of a plurality of coordinated base stations,
    wherein the single serving base station determines an initial feasible set of precoders for the mobile station, and
    wherein the MIMO wireless communications system comprises an equivalent multiple-input single-output (MISO) wireless communications system.

10. The method of claim 9, wherein the MIMO wireless communications system performs maximum signal-to-leakage-plus-noise ratio (MSLNR) beamforming to determine the initial feasible set of precoders.

11. The method of claim 9, wherein the plurality of coordinated base stations exchange a channel quality measurement.

12. The method of claim 9, wherein the single base station determines a structure for a downlink precoder by optimizing a weighted sum-rate across multiple resource slots in at least one of time, frequency, and code domains.

* * * * *